Figure 1:
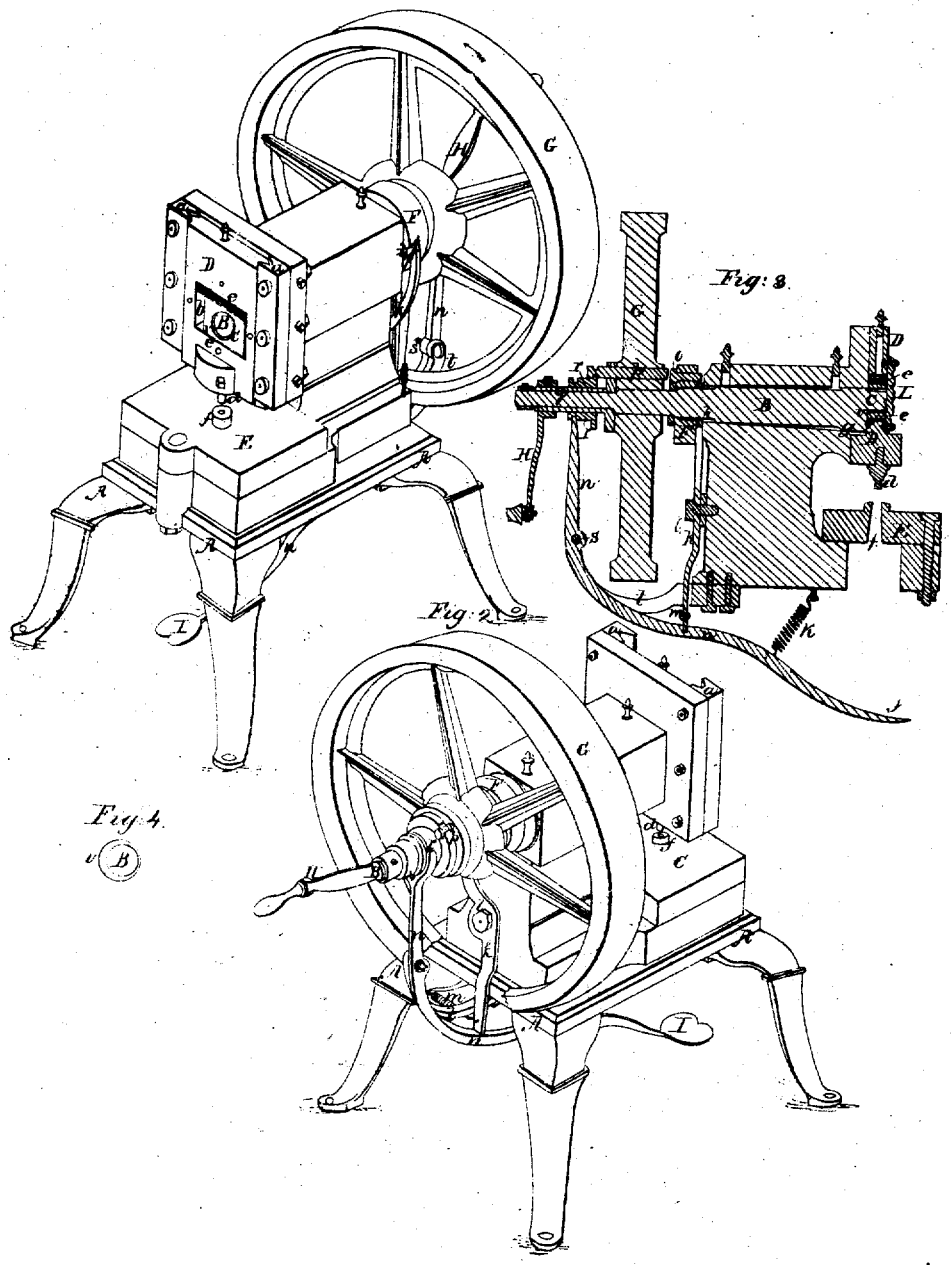

G. & De Grasse Fowler.

Metal Punching Mach.

No. 3,617. Reissued Aug. 24, 1869.

UNITED STATES PATENT OFFICE.

CHARLES PARKER, OF MERIDEN, CONNECTICUT, ASSIGNEE OF GEORGE FOWLER, AND MALTBY AND SOPHRONIA FOWLER, ADMINISTRATORS OF THE ESTATE OF DE GRASSE FOWLER, DECEASED.

IMPROVED MACHINE FOR PUNCHING METAL.

Specification forming part of Letters Patent No. 12,723, dated April 17, 1855; extended 7 years; Reissue No. 3,617, dated August 24, 1869.

*To all whom it may concern:*

Be it known that DE GRASSE FOWLER and GEO. FOWLER, of Wallingford, in the county of New Haven and State of Connecticut, have invented a new Improvement in Machines for Punching Metal; and I do hereby declare the following, when taken in connection with the accompanying drawings and the letters of reference marked thereon, to be a full, clear, and exact description of the same, and which said drawings constitute part of this specification, and represent, in—

Figure 1, a perspective view of the machine, taken from the front end, showing the movement of the punch, its adjustment, &c.; Fig. 2, a perspective view of the same, taken from the rear end, showing the apparatus for putting the punch in and out of gear, &c.; Fig. 3, a view of a longitudinal section cut vertically through the center, showing a section of all the essential parts; and in Fig. 4 a cross-section of the eccentric or crank-pin (seen at B, Fig. 1) with an eccentric circle or case around it to vary the eccentricity of the motion.

This invention relates to an improvement in power-presses, the object being to disconnect the power at the time when and so as to leave the punch or slide of the press at a certain given point after one revolution; also to adjust the extent of reciprocation of the slide so as to adjust the depression of the punch or instrument carried by the slide.

The invention consists, first, in combining with the driving-shaft and with the driving-wheel upon the said shaft mechanism which operates automatically to disconnect the wheel from the shaft at a certain point after one revolution; second, in combining a rotating eccentric with a second eccentric, arranged upon it in such manner that the reciprocating movement imparted to the slide by the rotation of the shaft may be changed so as to cause the punch or stamp to constantly descend to a given point, and thus compensate for the gradual wear of said punch or stamp, as well as for slight differences in the length of different tools, and also accommodate the tool to different thickness of metal; also, in combining with the slide of a press and sliding block within which the eccentric works adjusting-plates, so that the slide may be adjustable to different elevations by changing the plates from above to below the block, or vice versa.

The main frame or body A A of the machine is made of cast-iron or any other suitable material, in the usual manner, substantially of the form shown in Figs. 1 and 2. The hole for the main shaft is reamed tapering, as shown in section in Fig. 3, so as to receive the main shaft B with its several offsets, as shown in section in Fig. 3. The main shaft B is made large at the front end to enable one by the eccentric journal on its end, as seen at C, Fig. 3, to give sufficient vertical motion to the punch, which may be assisted by the eccentric circle *v*, Fig. 4, and the other parts smaller to lessen friction, weight, &c., while it retains sufficient strength to prevent trembling. The slide or gate D, Figs. 1 and 3, is made of cast-iron or other suitable material, and slides in ways *a a* in the usual way, as shown in Fig. 1. In the central part of the slide is made an oblong mortise, *b*, with parallel sides, in which is placed the sliding square block *c*, with a round hole to receive the eccentric circle *v*, Fig. 4, and eccentric journal C, Fig. 4, as shown at B, Fig. 1. The sliding block *c* is made so much shorter than the mortise as to allow it to have sufficient longitudinal motion to accommodate the eccentricity of the journal even when enlarged by the eccentric circle *v*, while it has no room to move in a vertical direction. Another way of graduating the motion of the punch so that it may come down at all times to the exact point desired is to use thin plates of different thicknesses, which may be placed over or under the block *c*, and changed at pleasure, as seen at *e e*, Figs. 1 and 3; is inclosed; the block-plate, &c., with a plate as indicated in section at L, Fig. 3, is fixed the female die *f* in a suitable bed in the usual way, as seen at E, Figs. 1, 2, and 3. The dies may be changed or varied at pleasure to suit any kind of punching or forming of metal plates. The main shaft B is supported in bearings at *g* and *h*, Fig. 3. Back of the bearing *h* is fixed a permanent collet, F, which always revolves with the shaft B. In the front side of the collet is fixed a stud or projection, as seen at

*i*, Fig. 1, which acts upon the upper end, *j*, of the lever *k* to throw the wheel out of gear. This lever *k* works on a fulcrum-screw, *l*, Figs. 2 and 3, and is held to its place by a spiral spring, *m*, when the machine is in gear, while its lower end rests on the clutch-lever *n n*, as seen in Fig. 2, and in the back or rear side of this collet F is fixed a stud or projection, *o*, Fig. 3, against the side of which the sliding rod *p* strikes or presses when the machine is in gear. The fly-wheel G, with the loose socket *q*, is placed on the rear part of the shaft B, so as to be turned freely upon it while the machine is out of gear, and in this socket, *q*, is placed a crank, H, (where a crank is used.) Between this wheel G and the crank H, and loose upon the socket *q*, is placed the clutch *r*, which governs the sliding or connecting rod *p*, as shown in Figs. 2 and 3. This clutch *r* is moved by the clutch-lever *n n* by means of pins or projections working in a groove at *r*, Figs. 2 and 3. The clutch-lever *n n* works on a fulcrum-pin, *s*, in an inflexible arm, *t*, attached to the main bed of the frame, as shown in section in Fig. 3, and is worked by the foot applied to the front end at I to put the machine in gear, and this front end I is drawn up by the spiral spring *k*, Fig. 3, to throw the machine out of gear.

Having made and arranged the several parts of the machine as before described, the power is applied to the crank H, (or a band on the wheel G, or otherwise,) and the wheel G is revolved in the direction indicated by the arrow, when it will revolve freely on the shaft B without moving it, the clutch *n* being in the position indicated in Fig. 3. The workman then places his foot on the end I of the clutch-lever *n n*, when the upper end of the lever will force the clutch *r* up against the nave of the wheel G, and the sliding rod *p* will be protruded, so as to come against the side of the stud *o* in the collet F, and thereby revolve the shaft B, which, by means of the eccentric journal C, Fig. 3, (with the eccentric circle *v* arranged, as described, to increase or diminish the eccentricity,) will depress and elevate the punch *d*. When the lower end of the lever *n n* is depressed so as to put the machine in gear, the lower end of the lever *k*, by the action of the spiral spring *m*, Fig. 2, will be drawn over and upon the lever *n n*, so as to rest upon it, as shown in Fig. 2, and thus keep the machine in gear until the punch has operated on the material to be punched, &c., and has been again elevated to its highest position, when the stud or projection *i*, Fig. 1, acting on the upper end of the lever *k*, will force the lower end off of the lever *n n*, and the spiral spring *k*, Fig. 3, will draw up the end I of the lever *n n* and force back the clutch *r* to the position shown in Fig. 3, when the rod *p* will not reach the stud *o*, and therefore the machine will be out of gear, the punch resting at its highest elevation, and the lower end of the lever *k* resting against the side of the lever *n n*, as shown in section, Fig. 3. Should it be desired to keep the machine in gear for a number of operations in succession, the end D of the lever *n n* may be held down by the foot or any other power greater than that of the spiral spring *k*.

To adjust the slide so as to present the punch to different depressions, the eccentric circle is attached to the wrist-pin; but it is obvious that this is not the only manner in which the combination may be effected in order to produce the result desired, the object of such adjustment being to adapt the punch to different thickness of metal, or the slide to different lengths of punch or height of dies, or remove one or more of the plates *e* from above the block *c*, and place them below the block, or vice versa. It will be observed that the movement of the slide is arrested at its highest elevation. This is desirable, first, because it is in that position that the tool is removed or reset; second, that it leaves the entire space between the tool and die free, and, last and mos important, the operator is not liable to be injured by accidentally placing his hands beneath the die, for, as the slide cannot descend excepting when his foot is upon the lever, he is always aware when there is danger in placing his hand beneath the tool.

Having fully described this invention, what I claim as the invention of the said DE GRASSE FOWLER and GEORGE FOWLER, and desire to to secure by Letters Patent, is—

1. Combining with the slide and shaft of a power-press and the wheel by means of which the said shaft is caused to revolve, a mechanism which operates automatically to disconnect the said wheel from the shaft at a certain point after one revolution.

2. In a power-press, combining, substantially as described, with the rotating shaft and the slide or tool-stock, an eccentric wrist-pin and an eccentric circle or ring placed upon and around said wrist-pin for the purpose of varying the play of said slide or stock.

3. In combination with the wrist-pin B, the slide D, and block *c*, the adjusting-plates *e*, more or less in number, substantially as and for the purpose set forth.

CHAS. PARKER,

*Assignee of Geo. Fowler and Maltby and Sophronia Fowler, administrators of the estate of De Grasse Fowler.*

Witnesses:

CHAS. L. TAYLOR,
JOHN W. MILES.